(No Model.)

O. H. JEWELL.
FILTER.

No. 546,738. Patented Sept. 24, 1895.

Witnesses.
Wm. M. Rheem
Wm. F. Heming

Inventor.
Omar H. Jewell
by Wm. Johnson
Atty.

UNITED STATES PATENT OFFICE.

OMAR H. JEWELL, OF CHICAGO, ILLINOIS.

FILTER.

SPECIFICATION forming part of Letters Patent No. 546,738, dated September 24, 1895.

Application filed May 11, 1895. Serial No. 548,974. (No model.)

*To all whom it may concern:*

Be it known that I, OMAR H. JEWELL, a citizen of the United States, residing at Chicago, in the county of Cook and State of Illinois, have invented certain new and useful Improvements in Filters; and I do hereby declare the following to be a full, clear, and exact description of the invention, such as will enable others skilled in the art to which it appertains to make and use the same.

This invention relates to improvements in "gravity-filters" of the kind adapted for filtering large masses of water and which are provided with a power-driven agitator for stirring up the filtering material during the process of washing and cleansing the same.

The object of the invention is to provide a filter having the highest efficiency, and which can be constructed and operated at minimum cost for material and labor.

The invention consists, briefly, in combining a filter and subsiding-chamber in one tank or vessel occupying but one foundation and so constructed and arranged relatively that the accumulation of sediment in the subsiding-chamber may be conveniently removed and driven out therefrom by mechanical appliance and without other power or machinery than that found in connection with the agitator, which is thus utilized for this purpose.

The invention further consists in the novel features of construction, combination, and arrangement of parts hereinafter described and set forth, reference being had to the accompanying drawings, in which—

Figure 1:
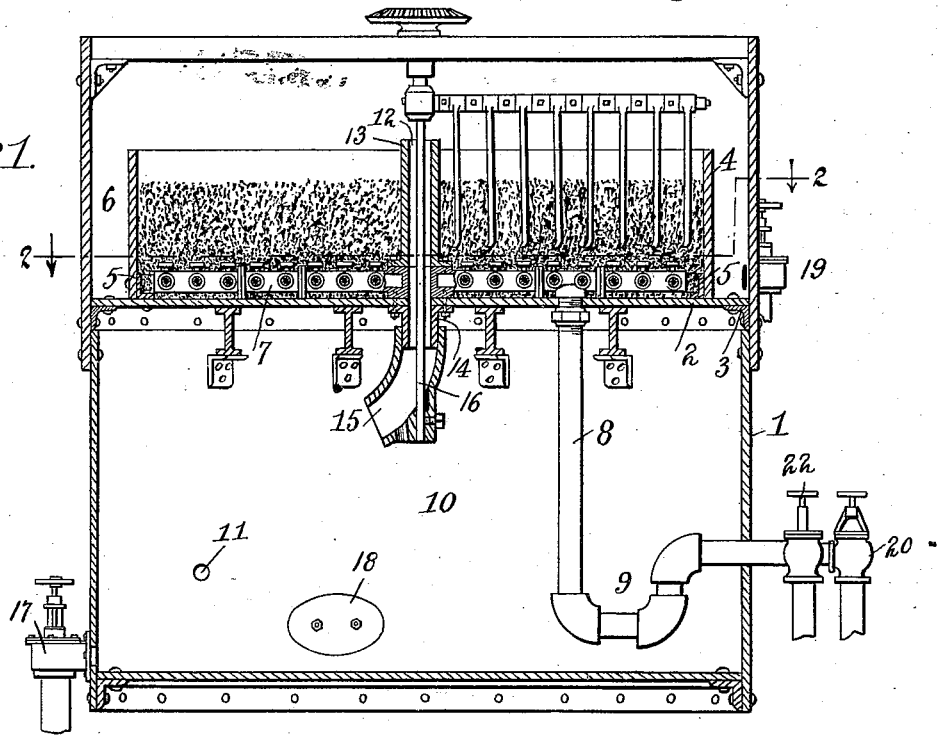
Figure 2:
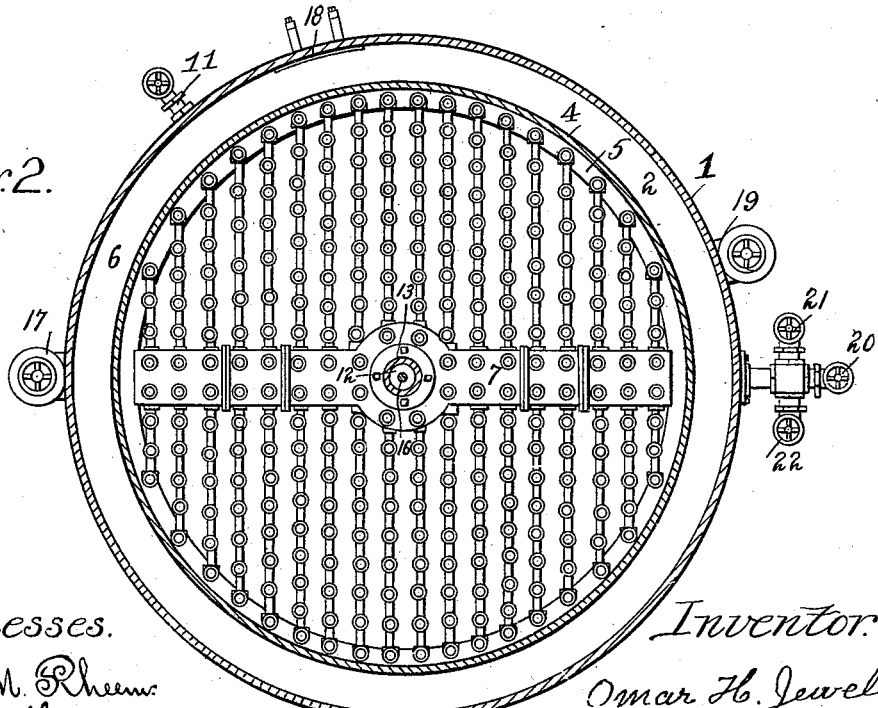

Figure 1 is a vertical central section of a combined filter and subsiding-chamber embodying my invention; and Fig. 2 is a transverse section of the same, taken on the line 2 2 of Fig. 1.

It is to be understood that the parts forming the filter proper, in which are comprised the filter-material tank and agitator are not fully shown and set forth herein, a patent having been granted for this part of the apparatus to Omar H. Jewell and Ira H. Jewell, No. 509,126, dated November 21, 1893, to which reference is to be had for a more particular description, being practically identical herewith, except as to the requirements for its connection with the subsiding-chamber, and which will be clearly apparent.

A partial disclosure of this present invention has also been made and claimed in an application filed by me March 6, 1895, for improvements in filters, Serial No. 540,798.

Referring to the drawings, 1 designates a cylindrical tank comprising a shell and bottom formed of boiler-iron riveted up and made tight in the usual manner. Said shell or tank is divided transversely midway its length by a partition-plate 2, supported upon an annular ring of angle-iron 3, riveted to the inside of the shell and to said partition-plate and made tight therewith forming two compartments or tanks, the upper one open at the top and the lower a sealed one. Within said upper tank is located the filter-material tank, the bottom of which is formed by the said partition-plate, to which the shell portion 4 is secured by the angle-iron 5. Said material tank is formed and set concentric within the main tank, leaving an annular space 6 between said tanks. A filter-water manifold-pipe 7, made in sections, extends diametrically across said material tank upon the bottom thereof with lateral branches upon either side therefrom, the whole provided with screen-covered cup openings into which the filtered water enters and flows from the manifold down the filtered-water pipe 8 to the water-reservoir outside the tank. Said pipe is provided with a water-trap 9. Said filtered-water pipe is extended some distance below the filter-tank to form a downdraft by removing the air-pressure from the under side of the filter-bed, and thus to make effective the air-pressure upon the water above said bed, and said trap is for the purpose of sealing the lower end of said filtered-water pipe to prevent the air from entering therein above said trap when the flow and velocity of water down the pipe is diminished by the accumulation of impurities in the bed.

10 is the lower tank or compartment, adapted to form a subsiding-chamber, into which the unfiltered water flows through the admission-valve and opening 11, and to the bottom of which sedimentary particles gravitate and are accumulated. Said subsiding-chamber communicates with the upper filter-tank by means of a central opening 12, formed through the partition-plate, manifold, and pipe 13, the upper end of which extends above the top of the material tank, the joints between the several parts being formed and made water-tight, so that the unfiltered water can only discharge into or enter the filter-tank through said central opening and from the top of said pipe. Said central opening is extended below the partition-plate by a short pipe 14 secured thereto, upon which an elbow-pipe 15 is loosely fitted to turn thereon. Said elbow is secured to the lower end of the agitator-shaft 16, and is adapted to be rotated therewith, the shaft being extended and carried down through the central opening into the subsiding-chamber for this purpose. The subsiding-chamber is provided with a valve-outlet 17 for removal of sediment therefrom, and with a manhole 18, convenient for construction and repairs, and the filter-tank is provided with a valved outlet 19 at the bottom of the annular space for the discharge of wash-water and for drawing off any sediment deposited therein. The filtered-water pipe is provided with a valve 20 upon the outside of the tank, between which a lateral pipe and valve 21 connects the wash-water-supply stand-pipe or pump therewith, and opposite thereto a lateral pipe with valve 22 discharges into a sewer.

The practical operation is as follows: The unfiltered water is admitted into the subsiding-tank until it is full, and continues to flow therein, passing up the central opening, filling, also, the filter-tank to the desired height above the material tank, at which point it is maintained during filtration, the water filtering down and passing through the trap-pipe to the pure-water reservoir, as will be readily understood, and as the subsiding-chamber is comparatively large the sediment has ample time to settle therein. In filters of this class daily washing is required, while the sediment in the subsiding-chamber may accumulate for a month or more before its removal is necessary. The daily wash is performed by closing the valve to the subsiding-chamber, filtering the water down, closing the valve in the pure-water pipe and opening connection therewith to the wash-water, stand-pipe or pump, forcing the water up through the filter-bed, during which the agitator is kept in motion, and the washed-out impurities flow over the top of the material tank into the annular space surrounding it, and pass out through the valve-opening at the bottom thereat. The wash-water is prevented from getting into the subsiding-chamber by the central pipe, which projects above the top of the material tank for this purpose. The wash is completed by closing the valve of the annular space and permitting the first filtered water to pass out into the sewer instead of the pure-water reservoir. To remove the sediment from the subsiding-chamber the contained water is first drawn off, and the wash-water is admitted to the filter from the stand-pipe, as for the daily wash, which may be carried on at the same time, as described, except, that the filter-tank outlet-valve is kept closed, thereby raising the water therein to a higher plane, and above the top of the central opening-pipe, down which the water falls with considerable force, aided centrifugally by the revolution of the elbow upon the agitator-shaft, thus flushing the chamber and driving the sediment therefrom through the outlet-opening, and making use of the filter wash-water for the purpose, whereby a saving of water is effected. It will be noticed that the elbow is perforated for a stream of water to strike the tank at the bottom. Any number of such may be used at various angles, if desired. It will also be noticed that revolving the elbow, as is necessary during the daily wash, or at any other time with a full tank, does not tend to stir or draw up the sediment, but rather the opposite effect, the sediment being driven away thereby.

Heretofore filter and subsiding tanks have been formed separate and set upon independent foundations with outside connection, and the sediment removed from the subsiding-tank principally by manual labor. My invention requires but one-half the floor-space and foundation, while the sediment is mechanically removed, thereby securing a large reduction in the cost of construction and operating expenses, with economy of water consumption.

I am aware that filters have been submerged within a tank or water-cooler, a space being left between and around the filter, in which the tank or cooler is primarily a subsiding-tank to the extent of the said between space. Such is not my invention. In my invention the filter-tank is supplied from the subsiding-tank through a central pipe vertically elevated above the subsiding-tank and above the superimposed filter-bed, through which central pipe little, if any, non-floating sediment can possibly find its way to the filter-bed.

It is obvious that the character of my invention would not be materially changed by connecting the subsiding-chamber by means of pipes leading therefrom either upon the inside or outside of the tanks and discharging above the top of the filter-bed, and by having the agitator-shaft extended through a stuffing-box bearing, with an auxiliary-shaft and agitator in the subsiding-chamber adapted to be coupled and uncoupled therefrom to stir up the sediment, and with a valved water communication between the annular space and subsiding-chamber to wash out the sediment therefrom when stirred up, as will be readily understood, and I do not therefore desire to have my invention restricted to the exact form and arrangement of the parts shown herein.

Having thus described my invention, I claim—

In a filter the combination of a filter tank, a subsiding tank, and a filter material holding tank, formed as described, with a central communicating passage or opening between said tanks, an agitator for said filter, the shaft of which passes through said central opening, and projects into said subsiding chamber, and a pipe elbow rigidly secured to said shaft, and adapted to be rotated thereby, to give force and direction to the water passing down through said central opening and elbow, for flushing out and removing the sediment from said subsiding chamber, substantially as set forth.

In testimony whereof I affix my signature in presence of two witnesses.

OMAR H. JEWELL.

Witnesses:
ALBERT W. GEATER,
WALTER C. JOHNSON.